United States Patent [19]

Teissier et al.

[11] 3,937,846

[45] Feb. 10, 1976

[54] PROCESSES FOR PREPARING NUTRITIONAL COMPOSITIONS FOR ANIMAL FEEDS

[75] Inventors: Raymond Teissier, Versailles; Jean Louis Colas, Saint-Maur-des-Fosses; Dominique Taisne, Paris, all of France

[73] Assignee: Produits Chimiques Ugine Kuhlmann, Paris, France

[22] Filed: June 2, 1975

[21] Appl. No.: 582,632

[30] Foreign Application Priority Data

June 6, 1974  France .............................. 74.19514

[52] U.S. Cl. .................. 426/69; 426/630; 426/635; 426/807
[51] Int. Cl.² ......................................... A23K 1/22
[58] Field of Search .............. 426/69, 89, 290, 807; 71/28; 260/555 C

[56] References Cited

UNITED STATES PATENTS

| | | | |
|---|---|---|---|
| 3,180,735 | 4/1965 | Titus | 426/69 |
| 3,585,043 | 6/1971 | Moore et al. | 426/69 |

*Primary Examiner*—A. Louis Monacell
*Assistant Examiner*—R. A. Yoncoskie
*Attorney, Agent, or Firm*—Brooks Haidt Haffner & DeLaHunty

[57] ABSTRACT

Processes for preparing nutrient compositions for animal feeds to obtain rapid and homogeneous impregnation of animal feed material with a nutrient material, such processes comprising preparing a dry mixture of from 35 to 48 parts of urea with 65 to 52 parts of urea phosphate, fusing the mixture at a temperature of from about 72° to 90°C, absorbing the mixture in an animal feed material, and cooling the product to provide a feed having a low moisture content and substantially free of germs, molds, and bacteria.

14 Claims, No Drawings

PROCESSES FOR PREPARING NUTRITIONAL COMPOSITIONS FOR ANIMAL FEEDS

BACKGROUND OF THE INVENTION

The present invention relates to new processes for preparing nutritive compositions for animal feeds, and more particularly, the present invention provides processes for imbuing materials utilized for animal feeds with a mixture of urea and urea phosphate.

The nutritional properties of urea-urea phosphate mixtures are known. The combination of these two ingredients, in contrast to urea alone, has the advantage of being less toxic and of supplying phosphorus. Aside from dry mixtures, various processes have been proposed to permit the absorption of a urea-urea phosphate mixture by animal feed materials.

In outline, these prior suggested processes involve dissolving urea and urea phosphate in an appropriate solvent, such as water, ethyl alcohol, and propylene glycol, or in pseudo-liquid products such as sugar-beet molasses or sugar-cane molasses. This solution is then absorbed on a material which is suitable for animal feed. The resulting product is thereafter dried as necessary, sometimes using the heat of a complementary neutralization reaction and then by effecting the final drying using classical methods. The finished product is usually ground thereafter.

These prior art processes all present certain disadvantages, notably that of providing a final product having too high a moisture content. Furthermore, such finished products are not free from germs, mold spores, and bacteria.

THE INVENTION

The present invention avoids these difficulties and, additionally, provides numerous other advantages which will appear to those skilled in the art from a consideration of this disclosure and the examples. Briefly, the processes of this invention comprise preparing a dry mixture of from 35 to 48 parts of urea with each 65 to 52 parts of urea phosphate; melting the mixture at a temperature from about 72° to 90°C, impregnating one or more animal feed materials with the molten mixture, and then cooling the product so formed. All parts, percentages, proportions and ratios herein are by weight, unless otherwise stated.

According to one preferred embodiment of the present invention, instead of a physical mixture of urea-urea phosphate, a unique crystalline salt is used, in which salt the composition is substantially the urea-urea phosphate eutectic mixture. This urea-urea phosphate compound can be prepared by reacting, at a temperature between about 50° and 80°C, a phosphoric acid containing from about 45 to about 65 percent $P_2O_5$ with a sufficient quantity of urea to form a mixture containing from 64 to 60 percent urea and from 36 to 40 percent phosphoric acid, (based on $H_3PO_4$). Cooling the aqueous solution so produced provides crystals of a urea-urea phosphate composition which after separation from the liquid phase, has a composition in the neighborhood of 61.5 percent urea and 38.5 percent of 100 percent phosphoric acid.

This particular preferred embodiment is advantageous in that it replaces the two crystallization steps necessary separately to crystallize the urea and urea phosphate by themselves and in that it avoids the difficulties inherent in the overall operation of mixing the two crystals (it being necessary in obtaining a homogeneous mixture of crystals to have crystals of similar size, shape, density, and so on).

According to another embodiment of the invention, the acidity of the impregnated feed obtained herein can be varied to a greater or lesser extent by the addition of alkaline materials which increase the pH. Examples of materials desirably used herein are soda, lime, magnesia, potash, or mixtures of two or more of such basic substances. This also augments the quantity of the elements sodium, calcium, magnesium, and potassium in the finished animal feeds. The neutralization with such alkaline materials can be carried out progressively during the cooling of the impregnated material, that is, the animal feed material into which the fused urea-urea phosphate mixture is absorbed. The addition of such basic material is carried out to avoid any excessive increase of the temperature which would cause decomposition of the nitrogen compounds in the molten mixture. Alternatively, the basic material can be added to the impregnated material.

In another embodiment of the invention, sulfates, desirably inorganic sulfates, can be added to the molten urea-urea phosphate mixture. A particularly preferred inorganic sulfate is ammonium sulfate. Such sulfate addition is carried out so that the ratio of nitrogen-sulfur in the final product reaches a value of at least about 13, this value conforming to the actual nutritional requirement for animal feeds.

In still another embodiment of this invention, trace elements such as cobalt, copper, manganese, zinc, and the like can be added to the melt of urea and urea phosphate. Such trace elements can, for example, be added in the form of finely powdered sulfates which dissolve in the aforesaid molten mixture.

According to yet another embodiment of the invention, it has been established that it is advantageous to introduce vitamins, such as vitamin A, vitamin D, and vitamin E. By reason of their thermolabile nature, these are introduced into the mixture just before passing the feed through the final finishing operation, such as a press. The types and dosages of the vitamins used depends in essence upon the degree of enrichment of the impregnated substrate and in view of the nutritional requirements of the finished ration, which will be readily determined by one skilled in the art based on such considerations.

According to another embodiment, it has been discovered that the finishing of the urea-urea phosphate impregnated feed material, then possibly neutralized by any of the aforesaid methods, is facilitated by employing molasses or a molasses product introduced directly onto the impregnated substances either before introduction into or within the interior of the same finishing equipment, in the case of using an extrusion press.

The quantity of added molasses material is from about 0.1 to 20 parts of molasses to 100 parts by weight of impregnated substrate, and preferably from 2 to 10 parts of molasses for each 100 parts of impregnated substrate. This addition is especially advantageous for vegetable materials strongly enriched in mineral salts and which, because of this, are difficult to pass through the perforations used to produce the finished enriched feed in the form of cylindrical granules. Furthermore, the addition of glycide to the feed is nutritionally important for increasing the appetite of the animals and for augmenting the energy content of the feed so produced.

The feed substances to be impregnated, also called absorbent substances or feed materials herein, should be used in an appropriate form to facilitate absorption of the melt. The conditions which are required in the absorbent for optimal results are those well known for all absorption processes. Thus, it is known that a material which is porous or spongy favors absorption. It is also known that an appropriate fineness of grinding enhances absorption.

The impregnation of the urea-urea phosphate mixture or eutectic composition by the substance used for feeding animals can be carried out either by impregnation of the urea-urea phosphate mixture or composition by the aforesaid substance, or in a preferred method by spraying the molten urea-urea phosphate mixture or composition onto the surface of the feed substance to be impregnated, this latter advantageously being in divided form. The particles of the substance to be impregnated can be kept in motion in the entire conventional mixing apparatus providing a single agitation system. The spraying or dispersion can be effected by any appropriate means, for example, by an apparatus using a simple pipe system to supply a calibrated orifice, or by an arrangement with jets or by such other means useful for applying the molten mixture to the agitated particles of the substance to be impregnated.

The quantities of absorbent feed material used in the present invention depend upon their nature and their physical state. Suitable materials for use in the present invention can readily be selected by one skilled in the art after understanding the present disclosure, by considering the absorbent and its properties, together with the desired characteristics of the final product.

The present invention permits absorption of the melted urea-urea phosphate mixture by substances containing a greater or lesser amount of cellulose. Such substances include alfalfa, ground fodder, straw, corn cobs, and vegetable waste including such well-known industrial products as miller's tailings, bran, broken rice, and other ground materials or dehydrated products such as brewer's grains, sugar-beet or fruit pulps, and the like. Among all these products, oil press cakes offer excellent results with respect to the urea-urea phosphate melts, and are accordingly preferred in certain embodiments of the invention.

It will be understood from the present description that the invention is equally useful in preparing animal feeds with whole grains cooked in the molten mixture and pulverized after cooling. The present invention also permits the preparation of feeds with products practically free of cellulose, such as cereal and other farinaceous flours.

It is equally possible, according to this invention to prepare animal feed compositions starting with mineral substances capable of being impregnated with the urea-urea phosphate melts. This is done with a view to facilitating particle size reduction after cooling or of conferring particular properties on the product, as for example, salt licks.

The feed compositions prepared according to this invention can be given in a selected amount as-is to the animals or they can readily be incorporated into the total ration. These nutrient compositions according to the present invention are adapted to feed a variety of animals. They are particularly suited for feeding bovine animals, such as cattle and the like.

Among numerous advantages according to the invention is the rapid and homogeneous impregnation of animal feed substances by the fluid urea-urea phosphate melt. This leads directly to a finished product having a very low water content, in fact, a water content less than the initial moisture absorption. The invention also obviates the necessity for grinding the final product. By the combined effect of the heat, the acidity, and the absence of water, the process of the present invention provides a feed which is free of germs, mold spores, and bacteria and therefore of any toxic products produced by such microorganisms.

The present invention equally provides an appreciable economy in the quantity of absorbent material which can be used, in contrast to the solubilization technique of the prior art, for a given amount of nitrogen and phosphorus. It has been found according to the present invention that for a given quantity of some absorbent feed materials, it is possible to absorb considerably more urea and urea phosphate than is the case in prior art processes.

The following examples are given to illustrate embodiments of the invention as it is presently preferred to practice it. It will be understood that these examples are illustrative, and the invention is not to be considered as restricted thereto except as indicated in the appended claims.

EXAMPLE I

Forty parts of urea and 60 parts of urea phosphate are dry-mixed, and 65 parts of the mixture so obtained is heated to 85°C with agitation until complete melting is obtained. There is then progressively introduced into the melt, while providing heating and light agitation, 35 parts of Chinese hemp palm kernel cake (from the palm trachycarpus) having the following particle distribution:

16.3% having a diameter greater than 0.8 mm.
40.2% having a diameter between 0.4 and 0.8 mm.
43.5% having a diameter less than 0.44 mm. The water content of this material is 12%.

After mixing is complete, the temperature is allowed to drop to ambient. A pulverized product is obtained having a water content of 4% and containing the equivalent of 120 g of protein material for each 100 g of product. The particle size distribution of this product is:

19.5% with a diameter between 1 and 2 mm.
54.5% with a diameter between 0.5 and 1 mm.
26.0% with a diameter of less than 0.5 mm.

EXAMPLE II

A dry mixture of 40 parts of urea and 60 parts of urea phosphate is prepared, and 55 parts of this mixture is heated to 85°C with agitation until a complete melting and fusion is obtained. While maintaining the temperature and with mild agitation, 45 parts of palm kernel cake is added, the cake having a moisture content of 12% and the following particle size distribution:

0.25% with a diameter greater than 0.4 mm.
43.0% having a diameter between 0.25 and 0.4 mm.
56.75% with a diameter less than 0.25 mm.

The mixture is thereafter permitted to cool to room temperature.

A pulverulent product is obtained with a moisture content of 5% and contains the equivalent of 100 g of protein material for each 100 g of product. The final product is similar to that produced in Example I.

EXAMPLE III

A dry mixture of 40 parts of urea and 60 parts of urea-phosphate is prepared, and 50 parts is melted as in the preceding Examples. Under constant heating and agitation, there is introduced progressively into the 50 parts of the mixture, 50 parts of dried sugar-beet pulp. After cooling, an acid, pulverulent product is obtained having the same appearance as the starting material and containing the equivalent of 95 g of protein matter for each 100 g of final product.

EXAMPLE IV

A mixture of 33 g urea phosphate and 22 g urea is prepared by dry mixing, the mass is fused at 85°C under constant agitation, and 30 g of Chinese hemp palm kernel oil cake identical to that of Example II is progressively introduced with heating and mild agitation. The product is cooled to 60°C, and 15 g of lightly carbonated slaked lime is progressively added.

The product obtained, without drying or grinding, is a "flowing" powder with a pH of 6.5, a moisture content of 8% (as opposed to 12% in the starting press cake), and has the following size distribution:

- 7% having a diameter between 1 and 2 mm.
- 22% having a diameter between 0.5 and 1 mm.
- 71% having a diameter less than 0.5 mm. The weighted average ratio of Ca/P in the product is 1.2.

EXAMPLE V

This example shows the treatment of the press cake of Example I according to the prior art technique. Fortyeight parts of urea phosphate and 32 parts of urea are dissolved in 20 parts of water at 50°C. To 65 parts of this solution is progressively added 35 parts of the cake of Example I with heating and mild agitation. After homogenization and mixing the product contains 16.6% water, of which 13% comes from the initial solution, so that a drying operation is required for its preservation and use.

This product is accordingly charged to a carefully controlled dryer to avoid decomposition of the urea and urea phosphate. After removal of the water due to the starting solution absorbed by the cake, the final product contains:

- 4 parts water
- 40 parts cake solids
- 60 parts urea/urea phosphate mixture and the equivalent of 108 g of protein for each 100 g of final product.

COMPARISON OF EXAMPLES I AND V

These comparisons are carried out starting with identical quantities of the same cake. It can be seen that the process of the present invention provides a higher grade of protein matter than the prior art process.

It should be noted that calculations also show that the process of the present invention permits an important saving of energy by comparison with prior art processes. The thermodynamic data are as follows:

Heat of fusion of urea/urea phosphate eutectic:
$\Delta Hf = + 43 \pm 2$ cal/g (laboratory measurement)

Specific heats:
Urea phosphate: +0.35 cal/deg. C-g (laboratory measurement).
Urea: +0.32 cal/deg. C-g
Cake: +0.3 cal/deg. C-g
Urea phosphate/urea solution: About 0.7 cal/deg. C-g.

Heats of solution:
Urea phosphate: + 7.65 Kcal/mole
Urea: + 3.60 Kcal/mole

From these data, calculations for a reference temperature of 20°C shows:

FOR EXAMPLE I

It is necessary to supply +4956 calories to prepare 100 g of product at 85°C or 76 cal/g of urea/urea phosphate eutectic.

FOR EXAMPLE V

It is necessary to supply +13,900 calories to prepare 100 g of dry product at 70°C (beyond 70°C the urea and urea phosphate melt and it is additionally necessary to include the heat of fusion). This product contains 60 percent of eutectic mixture, and this accordingly uses +231.7 cal/g of urea/urea phosphate eutectic.

EXAMPLE VI

A horizontal mixer having baffle strips is charged with 500 kg of dried sugar-beet pulp and 33 kg of powdered calcium carbonate, and after 10 minutes of mixing, 126 kg of a molten mixture of urea and urea phosphate is trickled through 1 centimeter diameter orifices into the mixer and onto the agitated pulp. The urea-urea phosphate contains a balanced ratio of 60 parts of urea phosphate to 40 parts of urea and is previously kept at a temperature of 80°C. Ten minutes after introduction of the molten mixture is completed the contents of the mixer are charged into an extrusion press and formed into cylindrical granules having a diameter of 8 mm.

The animal feed so obtained has the following composition:
- Total phosphorus 1.47%
- Calcium 2.39%
- Total nitrogen 5.85%

EXAMPLE VII

A 6,000-liter horizontal mixer is charged with 1,000 kg of dried sugar-beet pulp and 500 kg of dried alfalfa. After 10 minutes of mixing, 375 kg of a molten mixture of urea and urea phosphate, having the same ratio as that in Example I and previously brought to a temperature of 80°C, is flowed into the mixer through 1-centimeter diameter orifices.

The time for the introduction of the molten mixture is about 40 minutes. Thereafter, 100 kg of powdered calcium carbonate is dumped into the mixture and after 30 minutes of further mixing, the mixer contents are introduced into an extrusion press.

After a few minutes of running, 6% molasses is directly introduced into the press ahead of the extrusion plate. It is established that such molasses injection can provide a production rate of 2 to 2.5 tons/hr of animal feed through the extrusion plate.

The animal feed obtained has the following composition:
- Total phosphorus 2.18%
- Calcium 2.71%
- Total nitrogen 6.85%

EXAMPLE VIII

A mixer is charged with 870 kg of dried sugar-beet pulp, and then the agitated pulp bed is sprayed with 30 kg of a molten mixture of urea and urea phosphate, the balanced ratio being 55 parts of urea phosphate to 45 parts of urea and the molten mixture previously being brought to a temperature of 85°C. After 5 minutes, 3 kg of "Rovimix A/D$_3$ 50/5", that is, 150 million International Units of vitamin A and 15 million International Units of vitamin D$_3$, together with 1.5 kg of "Rovimix E 10", that is, 15,000 International Units of vitamin E, are introduced into the mixer.

The thus impregnated pulp is then introduced into the extrusion press where 80 kg of sugar-beet molasses is added. After extrusion, the animal feed obtained in the form of cylindrical granules has the following composition:

Total nitrogen 1.08%
Total phosphorus 0.65%
Calcium 0.07%

EXAMPLE IX

This Example shows the preparation of a crystallized composition of urea-urea phosphate. At a temperature of 80°C, 118 kg of urea is dissolved in 106 kg of phosphoric acid containing 50% P$_2$O$_5$. The mixture is cooled and the crystals which precipitate are recovered by centrifugation. There is thus obtained 126 kg of white urea-urea phosphate crystals having a composition of 61.5% urea and 38.5% of 100% phosphoric acid.

These crystals so obtained can be utilized in lieu of the urea-urea phosphate mixture of Examples I-IV, VI, and VII herein.

What is claimed is:

1. A process for preparing nutrient compositions for feeding animals which comprises preparing a dry mixture containing 35 to 48 parts of urea with 65 to 52 parts of urea phosphate, melting the urea-urea phosphate mixture so obtained at a temperature of from 72° to 90°C, absorbing the molten mixture in an animal feed material, and cooling the feed material containing the mixture.

2. A process according to claim 1 wherein the urea-urea phosphate mixture is a crystalline material containing about 61.5 percent urea and 38.5 percent of 100 percent phosphoric acid.

3. A process according to claim 2 wherein the crystalline material is prepared by reacting at a temperature of about 50° to about 80°C, phosphoric acid containing from about 45 to about 65 percent P$_2$O$_5$ with sufficient urea to provide a mixture containing from 64 to 60 percent urea and from 36 to 40 percent phosphoric acid, cooling the aqueous mixture so obtained to precipitate urea-urea phosphate crystals, and separating the crystals from the aqueous liquid.

4. A process according to claim 1 wherein during the cooling a basic material is added.

5. A process according to claim 4 wherein the basic material is soda, lime, magnesia, potash, or two or more of such basic materials.

6. A process according to claim 1 wherein a basic material is added to the molten urea-urea phosphate mixture before absorption of the molten mixture in the animal feed material.

7. A process according to claim 6 wherein the basic material is soda, lime, magnesia, potash, or two or more of such basic materials.

8. A process according to claim 1 wherein at least one sulfate is added to the molten mixture so as to obtain a ratio of nitrogen to sulfur in the final product of at least 13:1.

9. A process according to claim 1 wherein nutritional trace elements are added to the molten mixture.

10. A process according to claim 1 wherein vitamins A, D, E, or two or more thereof are added to the cooled feed material.

11. A process according to claim 1 wherein molasses is added to the feed material in the proportion of 0.1 to 20 parts of molasses to 100 parts of feed material containing the urea-urea phosphate mixture.

12. A process according to claim 1 wherein the molten urea-urea phosphate is dispersed onto the surface of particles of the feed material.

13. A process according to claim 1 wherein the animal feed material is cellulosic.

14. A process according to claim 1 wherein the animal feed material is Chinese hemp palm kernel cake.

* * * * *